(12) United States Patent
Singh

(10) Patent No.: US 6,985,461 B2
(45) Date of Patent: Jan. 10, 2006

(54) SOFTWARE FOR INSTALLATION AND CONFIGURATION MANAGEMENT OF NETWORK NODES

(75) Inventor: Gurprett Singh, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 918 days.

(21) Appl. No.: 09/814,888

(22) Filed: Mar. 22, 2001

(65) Prior Publication Data
US 2002/0176386 A1  Nov. 28, 2002

(51) Int. Cl.
*H04Q 7/00* (2006.01)

(52) U.S. Cl. .............. 370/329; 455/450; 455/464; 455/509; 370/255

(58) Field of Classification Search ........... 370/329, 370/328, 341, 332, 431, 437, 455, 436, 345, 370/336, 333, 334, 330, 324, 503, 464; 375/146, 375/147, 219; 455/449, 450, 464, 509, 434, 455/436, 524, 62, 63.1, 437, 443, 442.1, 455/435.2, 435.3, 446, 452.1, 452.2, 510, 455/512, 513; 709/230, 227, 222
See application file for complete search history.

(56) References Cited

U.S. PATENT DOCUMENTS

| | | | |
|---|---|---|---|
| 5,574,979 A * | 11/1996 | West .................... | 455/63.1 |
| 5,579,373 A * | 11/1996 | Jang ..................... | 455/436 |
| 5,635,940 A | 6/1997 | Hickman et al. ....... | 342/389 |
| 5,657,317 A * | 8/1997 | Mahany et al. ........ | 370/338 |
| 5,790,536 A * | 8/1998 | Mahany et al. ........ | 370/338 |
| 5,867,786 A * | 2/1999 | Ishi ....................... | 455/436 |
| 5,896,573 A * | 4/1999 | Yang et al. ............ | 455/453 |
| 5,923,702 A | 7/1999 | Brenner et al. ........ | 375/202 |
| 6,023,459 A | 2/2000 | Clark et al. ............ | 370/329 |
| 6,023,607 A | 2/2000 | Siira ..................... | 455/25 |
| 6,035,212 A | 3/2000 | Rostoker et al. ....... | 455/552 |
| 6,111,857 A | 8/2000 | Soliman et al. ........ | 370/254 |
| 6,697,415 B1 * | 2/2004 | Mahany ................. | 375/130 |
| 6,760,877 B1 * | 7/2004 | Lappetelainen et al. | 714/748 |
| 6,865,609 B1 * | 3/2005 | Gubbi et al. ........... | 709/230 |

FOREIGN PATENT DOCUMENTS

FR  2725089 A1 *  3/1996

* cited by examiner

*Primary Examiner*—Wellington Chin
*Assistant Examiner*—Jamal A. Fox
(74) *Attorney, Agent, or Firm*—Watts Hoffmann CO, LPA

(57) ABSTRACT

A software method and apparatus for installing and configuring network nodes in a wireless local area network by detecting noise levels on each of the available channels in the network. Each stationary access points listens on the available channels on the network. Each of the stationary access points determines a prioritized list of preferred frequencies or channels of operation based on the noise levels from the surrounding channels in use by other stationary access points. The listening stationary access point chooses a frequency and sets itself to the associated channel based on the strength of the other signals on that channel in the network.

28 Claims, 6 Drawing Sheets

SOFTWARE FOR INSTALLATION AND CONFIGURATION MANAGEMENT OF NETWORK NODES

FIELD OF THE INVENTION

This invention relates to software for network management and installation procedures for wireless local area networks, and more particularly to a method and apparatus for specifying operational characteristics of a network node by determining the most suitable available channel for communication in a cell between a fixed access point of a wireless local area network and mobile units operating in the cell.

BACKGROUND OF THE PRIOR ART

Wireless local area networks (WLANs) use infrared (IR) or radio frequency (RF) communications channels to communicate between portable or mobile computer terminals and stationary access points or base stations. These access points are connected by a wired or wireless communication channels to a network infrastructure which connects groups of access points together to from a local area network (LAN), which can include one or more host computers. In turn, the LAN can be connected to another larger network such as the Internet and the World Wide Web (Web). Several protocols, including the IEEE 802.11 standard, "Wireless LAN Medium Access Control (MAC) and Physical Layer (PHY) Specifications" have been designed to standardize WLAN communications. Such standardization is useful for optimizing user requirements, including interoperability, spatial layout, response time, loading and throughput requirements of the network.

"Roaming" terminals are mobile units that can associate with any stationary access point (SAP) in range within a WLAN, and may seamlessly move from SAP to SAP. Each roaming terminal analyzes received signals from access points in its vicinity and associates with a single access point. Communication with an access point connects a terminal with the LAN and therefore with external networks such as the Internet. The region around an access point can be referred to as a "cell". Roaming terminals can move from cell to cell and remain connected to the LAN and any other network to which the roaming terminal is connected.

The IEEE 802.11 standard defines as the frequencies or channels used for WLAN communications. Typically, a SAP must be manually configured to a particular set of frequency channels for use in a frequency hopping or direct sequence spread spectrum (DSSS) modulation technique. For example, in the 802.11b DSSS standard, there are three non-interfering channels spaced 25 MHz apart in the 2.4 GHz band (channels 1,6, and 11 in Table 1 hereunder). Multiple IEEE 802.11b networks may operate in the same area by suitable section of the channel for each SAP. This channel configuration is normally set manually by the user or by factory default. Such techniques are disadvantageous since the manually setting of channels, or the selection and installation of factory-set SAPs at particular locations, is error prone. Moreover, even if configured correctly on installation, the selected installation pattern and frequency designations may not be optimal at all times due to data traffic, interference, or other time-dependent conditions during actual use.

Often times there can be several unrelated WLANs or "Extended Service Sets" belonging to different entities in a dense area such as an office building. The SAPs of these unrelated WLANs may use the same frequencies in close proximity. Therefore it is possible for a roaming unit associated with one WLAN to encounter interference with a communication link on an unrelated WLAN. This situation is not desirable. Thus, it is desirable for the SAPs to be able to implement an the optimum pattern or distribution of channel frequencies and have the ability to switch between channels to utilize the best communication link with the nearest available SAP.

SUMMARY

In general, the invention features a method and apparatus for WLAN channel management. The method and apparatus allow at either initial installation, on power-up, or during the course of use, the SAPs to negotiate and select a matrix pattern of independent, non-overlapping channels or center frequencies as defined by the IEEE 802.11 standard.

In general, in one aspect, the invention features a method of selecting a center frequency channel in a DSSS communications system for a transmission node on a wireless network. Each SAP inherently has the capability of using any of the allowable frequency channels. Under the IEEE 0802.11 standard, and national spectrum allocations, multiple center channels or center frequencies are available for the SAP to transmit. The method includes detecting a plurality of channel signals from surrounding nodes using a radio receiver, determining characteristics from each of the signals based on predefined desired signal-to-noise ratios, retry rates, or other criteria, and selecting a mode of operation and center frequency based upon achieving the maximum signal-to-noise of the signal available for use by that node.

Implementations may include one or more of the following techniques. A unique frequency for transmission may be selected from a set of available channels. The detection of signals from surrounding nodes may be periodically modified if a selected frequency becomes unsuitable for transmission. Transmission nodes may be physically placed according to minimize interference.

In general, in another aspect, the invention features a method of installing a set of stationary access points in a new network location, and automatically specifying the channel for each SAP. The method includes simultaneously applying power to the access points to initiate an installation software program on each access point, listening in each access point on all prescribed frequency channels for a period of time to determine the channel with the lowest frequency, selecting the frequency channel with the lowest noise level, setting the frequency channel for the access point to the selected channel and activating the access point to emit signals and operate on the channel most suitable.

Implementations may include one or more of the following processes. It may be determined that noise will be reduced is switching to a specific alternative channel is performed. A test signal may be synchronized on the alternative channel where noise levels may be measured and evaluated. This process may be repeated on different alternative channels until the optimum channel is selected.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
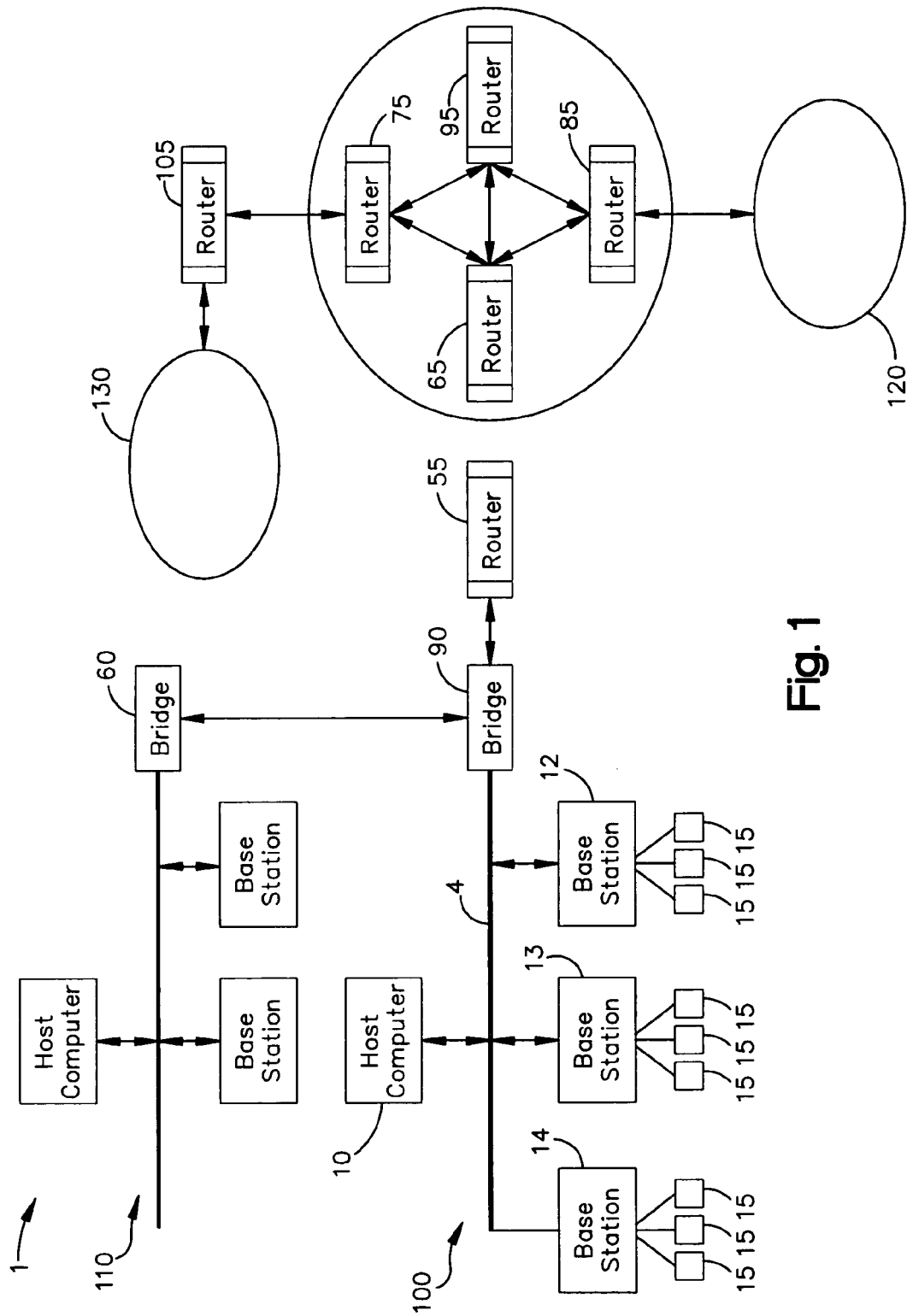
FIG. 1 illustrates a network environment in which the present invention operates.

FIG. 1 illustrates an exemplary network environment 1 having numerous nodes. A first LAN 100 includes a host processor 10 connected by a wired communications link 11 that is connected to a number of stationery access points or base stations 12, 13. In one embodiment, communications link 11 can be a serial or parallel type port such as RS-232C, general-purpose interface bus (GPIB), USB or any other similar bus. In LAN applications, the link 11 can be Ethernet, token ring or any other network protocol. Another base station 14 can be coupled to the host through the base stations 12, 13 or by a radio frequency (RF) link. Each one of the base stations 12, 13, 14 is coupled to a number of mobile units 15. The mobile units can be any of a variety of hand held units such as battery operated data terminals, bar code readers, or voice communications handsets. Various other types of remote terminals can be employed in the network environment, including data entry facilities such as keyboards and the like, as well as a display or a printer for indicating to a user information detected, transmitted and/or received by the terminal 15.

The network may have a large number of base stations, typically up to sixty-four, and several hundred remote units 15. Furthermore, the first LAN 100 may be coupled to additional LANs 110, 120, 130 through controllers such as bridges 50, 60 or routers 55, 65, 75, 85, 95, 105. Other typical embodiments for the remote units 15 are as portable digital assistants which include, but are not limited to, hand-held devices for network access to enable a user to receive person itinerary such as airline e-tickets, hotel confirmation information, credit card, bank account or brokerage account access, and the like.

This network environment of FIG. 1 can also be used for any facility having the need for a number of remote units to access a central control station such as a LAN 100. Such facilities can be but are not limited to a manufacturing facility, office building complex, warehouse, retail establishment, or like commercial facilities, or combination of facilities where bar code readers, for example, or similar data-gathering terminals are used for inventory control in stockroom or receiving/shipping facilities, at check out (point of sale) counters, for reading forms or invoices or the like, for personal security checking at gates or other check-out points, at time clocks, for manufacturing or process flow control, and other similar uses. Although hand-held laser-scan type bar code readers are one example, the remote units 15 may also be bar code readers of the wand or CCD-type, and may be stationary rather than hand-held. The device may be of the optical character recognition (OCR) type as well. Other types of data gathering devices may implement these features, such as temperature or pressure measuring devices, event counters, voice or sound activated devices, intrusion detectors and the like.

Figure 2:
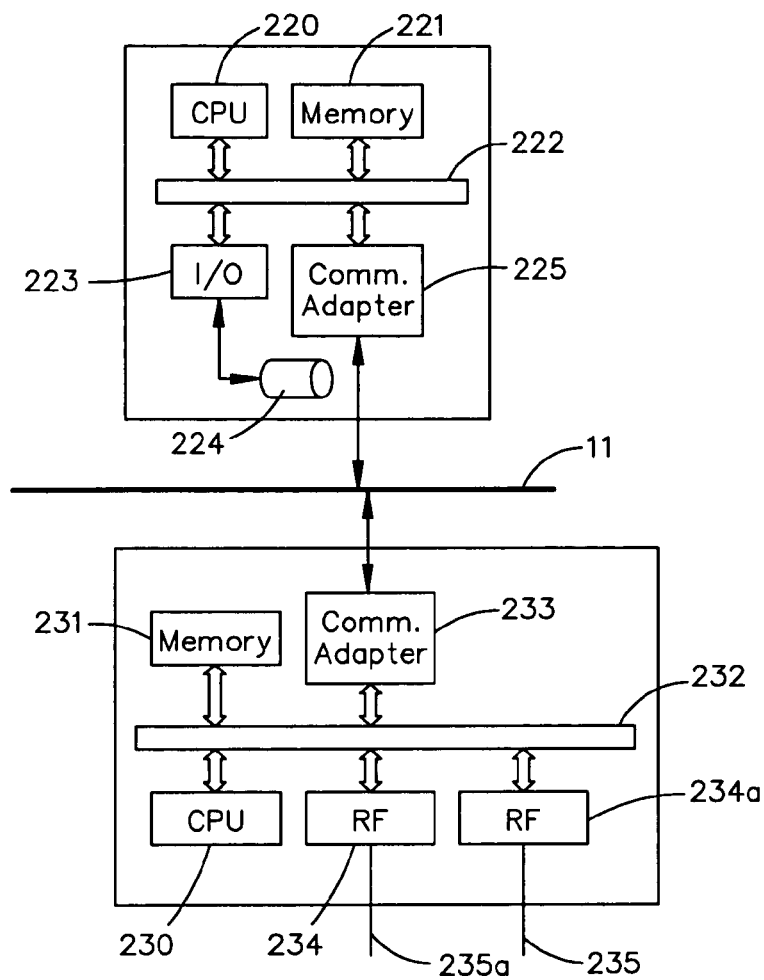
FIG. 2 illustrates a block diagram of a host computer and a base station in the network.

FIG. 2 illustrates a detailed view of a host computer 10 and a base station 12, 13 14 of FIG. 1. The host computer 10 includes a central processing unit (CPU) 220 that is connected to a memory 221 through a bus 222. An I/O module 223 connects the host computer to various devices such as a keyboard, video display and other peripherals. Disk storage 224 is connected to the I/O modules 223. A communications adapter 225 connects the CPU 20 through the bus 222 to the communications link 11.

The base stations 12, 13, 14 each utilize a CPU 230 connected to a memory 231 through a bus 232. A communications adapter connects the bus 232 to the communications link 11. An RF transceiver 234 is connected to the CPU 230 in each base station 12, 13, 14 through the local bus 232 and is connected to an antenna 235 for RF transmission and reception from the remote units 15 using a transmit/receive exchange protocol. In one embodiment, the exchange protocol is similar to a collision-sense multiple access (CSMA). A detailed discussion of this exchange protocol is discussed below with respect to FIG. 3. An additional RF transceiver 234a can be used as an RF link to and from other base stations, if necessary.

Base stations 12, 13, 14 are typically stationary units that use line power and often not accessible to an operator. The RF signal path in a typical environment is changeable because equipment in the environment may move around as well as the locations of the remote units 15. As a result, the particular base station that is in communication with the remote unit 15 can change. In an implementation, a "hand-off" protocol is used to change the base station, which is designated to communicate with the remote unit 15. In this manner, a remote unit 15 has a confirmed virtual link with only one base station at a time, although other base stations maybe in range. The base stations 12, 13, 14 act as intermediaries for the communication link between the remote unit 14 and the host computer 10. The main function of the base stations 12, 13, 14 is to relay data between the remote units 15 and the host computer.

Figure 3:
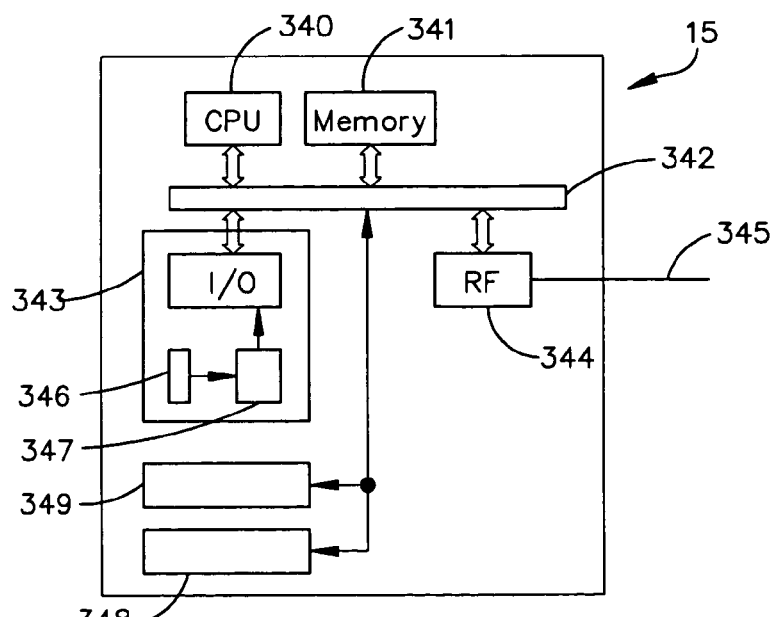
FIG. 3 illustrates a block diagram of a mobile unit.

FIG. 3 illustrates a detailed view of a remote unit 15. The remote unit 15 includes a CPU 340 connected to a local bus 342. A memory 341 is also connected to the local bus 342, and can provide instructions to the CPU 340. A peripheral bar code data acquisition device 343 is optionally coupled to the CPU via the bus 342. The device 343 can be used to detect and/or convert data from a bar code (not shown). The device 343 can be used to input data from a photo detector device 346 that produces a serial electrical signal fed to a code recognition circuit 347 responding to the characteristic patterns of bar code symbols and providing bar code data to the memory 341 via device 343 when a bar code is scanned. The bar code data can be moved to memory by a variety of techniques such as direct memory access (DMA) or CPU instructions. Ultimately the bar code data is transferred to an RF transceiver 344 for transmission to the base unit 12, 13, 14 and ultimately the host computer 10. The RF transceiver 344 is coupled to and controlled by the CPU through the bus 342, and transmits the ceded RF signal through an antenna 345 or detects and converts RF signals received by the antenna 345.

Typically, the remote unit 15 has a manual entry device 348 such as a keyboard, and a visual display 349 such as a liquid crystal display (LCD) device. The elements of the entry device 348 and the display 349 are scanned by signals generated in the CPU 340, or generated in an entry device and display I/O controller. In one embodiment, the I/O controller is an Intel® 8052 micro controller.

As discussed above, in one embodiment, a transmit/receive exchange protocol is used by the remote unit 15 to communicate with the base units 12, 13, 14. The exchange protocol is similar to a collision-sense multiple access (CSMA). The remote unit 15 first listens before transmitting, and does not transmit if the channel is not free. If an RF channel is quiet a transceiver in the remote unit 15 starts a transmission. A transceiver in the remote unit 15 typically begins a data exchange at its own initiative by first listening for other traffic for a brief time interval to, and, if the RF channel is quiet, starting a transmission at a time of its own selection. An outgoing transmission data packet lasts for a certain time interval $t_1$, then at a precise time delay $t_2$ the mobile unit 15 starts its transmission, the transceiver 344 begins listening for a return data packet from the base stations 12, 13, 14. The remote unit 15 waits for a very small time interval $t_3$ for this return, or "acknowledge" packet. If this packet is not returned during this time interval $t_3$, the remote unit 15 ignores any data packets that follow. Because the mobile units 15 control the data exchange between the remote units 15 and the base stations 12, 13, 14, the CPU 340 handles all exchange related tasks including data input from the bar scanner 343, keyboard and display scans, RF control, data stream transfers to and from the RF, and data coding and encoding. The remote unit 15 is therefore the primary controller of RF transmission and reception. The remote units 15 send a periodic data packet with no data to the base stations 12, 13, 14 in case the base stations 12, 13, 14 have data to transmit to the remote units 15.

As discussed above, the mobile unit 15 can be a portable computer. The portable computer can be used for a variety of computing purposes including but not limited to Internet access, data collection, messaging, word processing, scheduling, mathematical computation, and the like. For these purposes, the portable computer is loaded with an operating system. In an embodiment, the operating system can be any DOS or Windows platform. In specific embodiments, the operating system can be Windows 95, Windows 98, Windows 2000, Windows CE, Palm O.S, Linux, or others. In one embodiment, the memory 341 can be random access memory into which the operating system is loaded. In another embodiment, the memory 341 can be any type of firmware such as EPROM or EEPROM into which the operating system is "burned".

Figure 4:
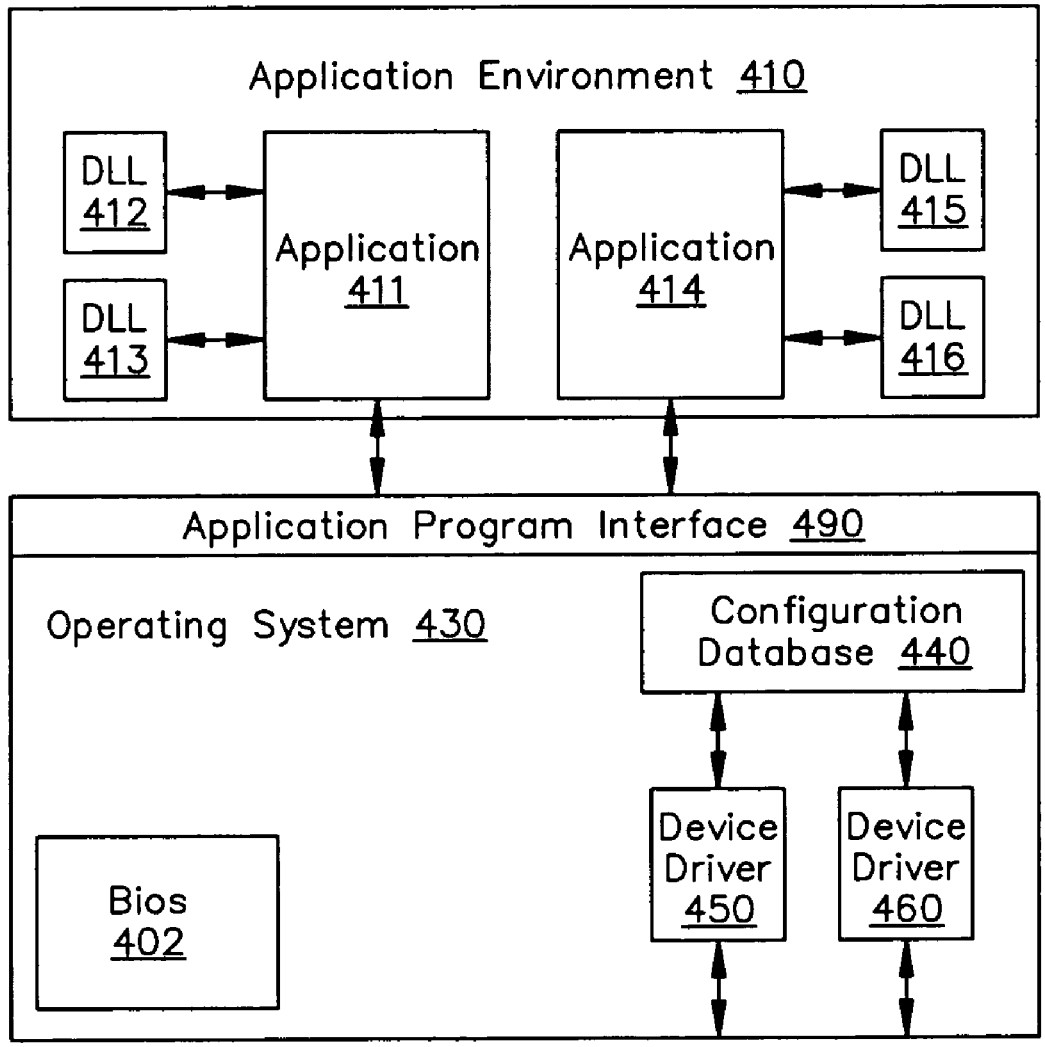
FIG. 4 illustrates an operating system having an application environment.

FIG. 4 illustrates an operating system having an application environment in which the software of the present invention may be implemented. As discussed above, the operating system 430 can be any one of the various Windows environments. The operating system 430 provides software to mange configure, enable and allocate physical resources for the application. For example, the operating system 430 may include a memory allocation algorithm to allocate the memory 341 among various software tasks. Additionally, the operating system includes instructions from the memory to control the RF transmissions (including frequency sets) and receptions, as well as data flow between the code data acquisition device 343 and the RF transceiver 344.

An application environment 410 contains one or more software application processes 411, 414. The applications 411, 414 can be any variety of applications for use on the remote unit 15. For example, the application 411 can be a browser for connecting to a network such as the Internet. The application 414 can be a configuration program that configures the remote unit 15 for use with the network to which the remote unit 15 connects.

Each application 411, 414 can have one or more processes 412, 413 and 415, 416 respectively, associated with them. These processes can serve a variety of purposes related to the applications 411, 414. For example, one or more of the processes can be a dynamic link library (DLL) 412, 413 and 415, 416 respectively associated with it. A DLL is a feature of Windows® platform that allow executable code modules to be loaded on demand and dynamically, and linked at run time. Library code can be updated, transparent to the applications 411, 414, and unloaded when no longer needed.

The operating system 430 can include an application programming interface 490 (API). The API 490 is the software that the application processes 411, 414 use to request and carry out lower level services performed by the operating system 430. For Windows®, the API also helps applications 411, 414 manage windows, menus, icons and other graphical user interface (GUI) elements. The API 490 includes a set of standard software interrupts, calls and data formats that applications 411, 414 use to initiate contact with device drivers 450, 460.

The operating system 430 can include one or more device drivers 450, 460. The device drivers 450, 460 provide control functionality specific to a particular physical device or class of devices. Additionally, the device drivers 450, 460 provide standard software interfaces allowing other system components to access the controlled device. For example, one device driver 450 can control the code data acquisition device 343 and provide data to and from applications 411, 414 through the API 490. The other device driver 460 can control the RF transceiver 344 that allows data to be transferred from operating system 430 to the RF transceiver 344 through device driver 460. Operating system 430 also includes a BIOS 402 to run standard start up routines for the remote unit 15.

Figure 5:
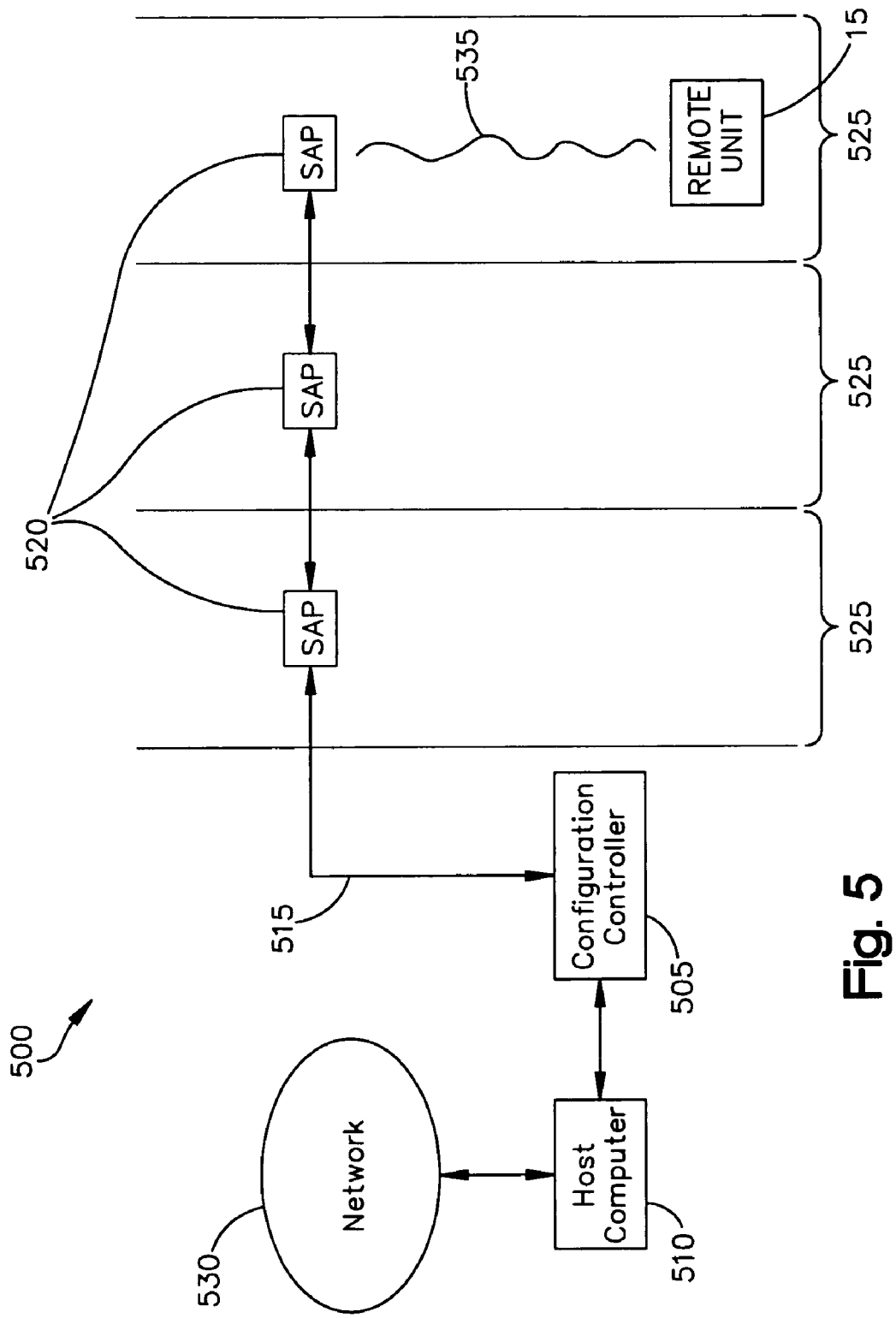
FIG. 5 illustrates an exemplary network system.

FIG. 5 illustrates an overview of an exemplary wireless network system 500 including a configuration controller 505 connected to several access points 520 by a wire, such as an Ethernet cable or wire. The configuration controller may include a multi-port hub, bridge, or similar network device. As discussed above the remote unit 15 can be associated with one or more access points 520. In a typical situation, the base station or access point 520 is used as the communication link between a remote unit 15 and a host computer 510. In turn, the host computer is typically part of a network 530, making up the entire wireless network system 500. In an implementation, the exemplary network system 500 may represent a retail store network in which a consumer uses a remote unit 15 to scan items for purchase and have that information transmitted over the network system 500. In such a situation, the consumer is roaming throughout an area in the store that can be very large. Several stationary access points (SAP) 520 are necessary in order to ensure that signals 535 transmitted to and from the remote unit 15 are picked up as the consumer moves between the cells 525 associated with each of the SAPs 520. The SAPs are kept hardwired to the host computer through link 515. In one embodiment, the link 515 is any number of communication lines such as, for example, coax. If there were only one SAP, then when the consumer moves out of range of the one SAP, that is, out of one of the cells 525 into another cell, the communication link between the remote unit 15 and the access point 520 can be lost because the signals 535 would not be powerful enough to maintain the link.

In a first embodiment, the present invention is implemented at the time of the initial installation of network nodes (base station or access points) in a new building or location to be served by a wireless LAN. Each access point is initially unprogrammed or generic with respect to the channel or frequency set at which it is to operate. This simplifies the installation task, since personnel do not have to match pre-programmed units to blueprint locations, or perform manual switch setting on each unit.

Conventionally, each base station site is thought of as covering a "cell", being an area in which a mobile station located therein will communicate with the base station. If two adjacent base stations in adjacent cells are operating on the same carrier frequency at the same time, there is a likelihood of interference between communications of the two adjacent base stations. It is therefore necessary to ensure as far as possible that this situation does not occur. It is known to use various mechanisms to increase the channel carrying capacity of individual channel frequencies within band spectrum.

The problem of assigning carrier frequencies to base stations in a non-interfering manner, is referred to as the frequency assignment problem. When the frequency assignment problem is extended to include the assignment of channels to carrier frequencies, this is referred to as the channel assignment problem.

Figure 7A:
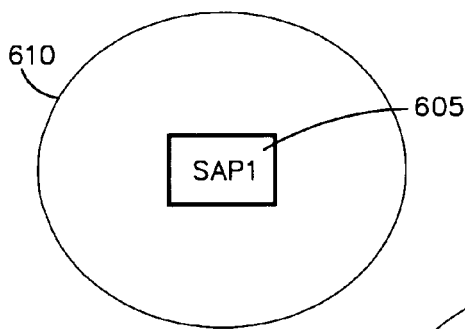
FIG. 7A illustrates a single access point having a frequency channel or channel set.
Figure 7B:
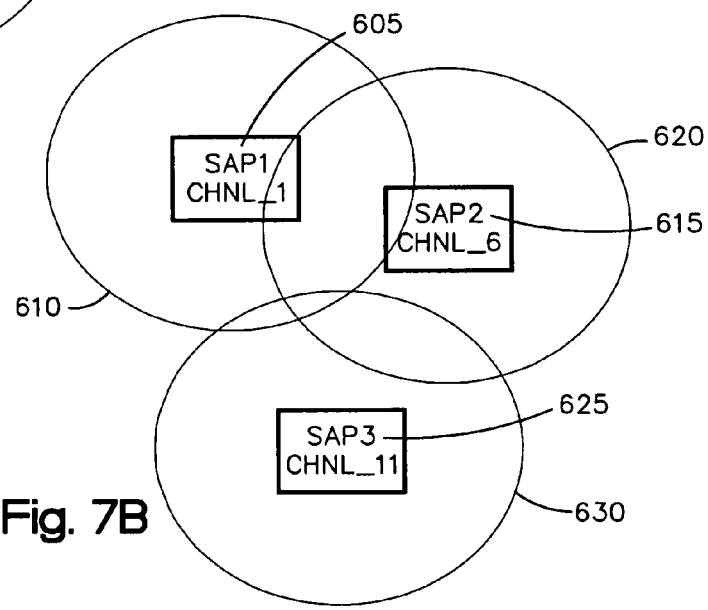
FIG. 7B illustrates three access points, each having a frequency channel or channel set.
Figure 7C:
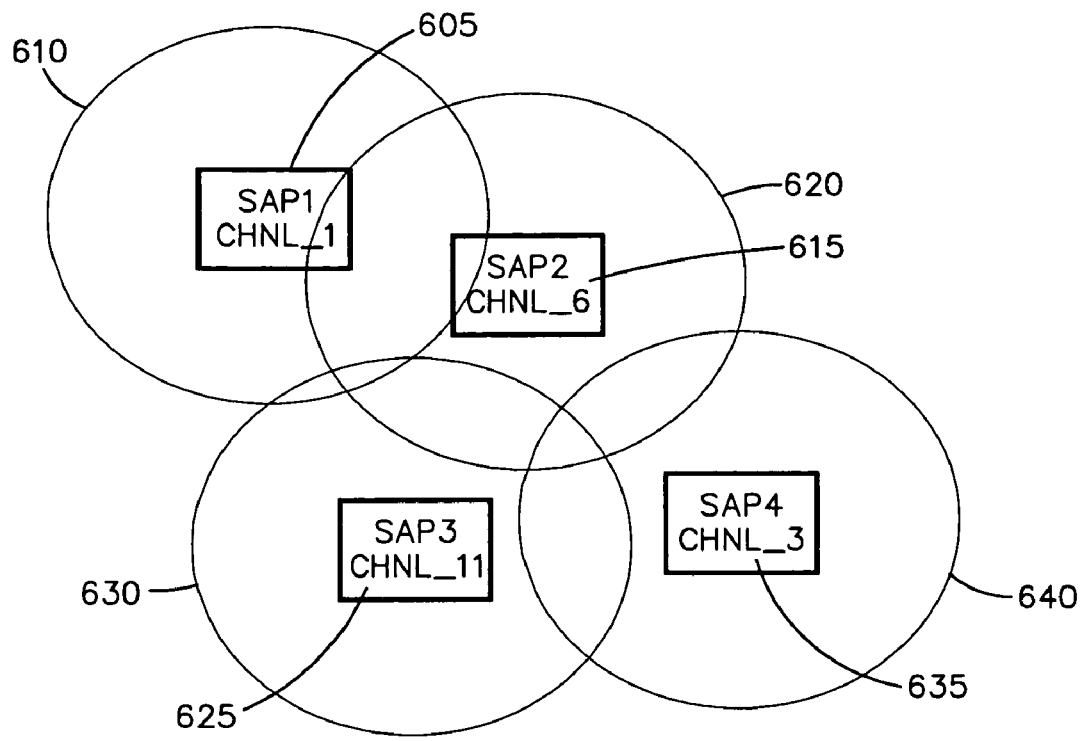
FIG. 7C illustrates four access points, each having a frequency channel or channel set.
Figure 7D:
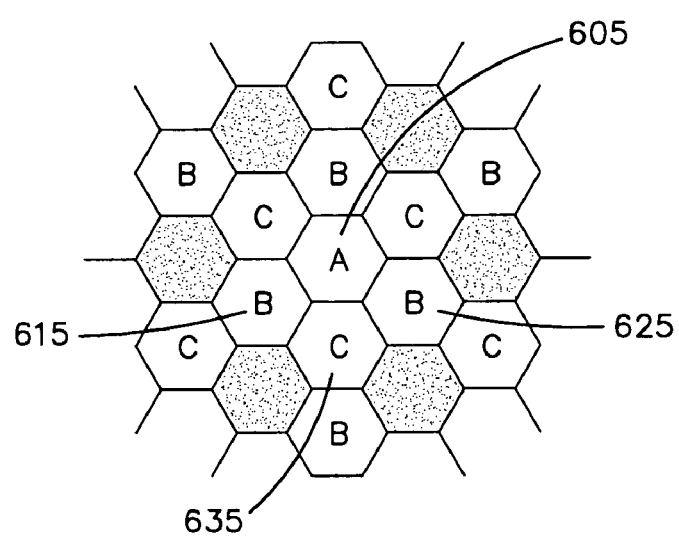
FIG. 7D illustrates a group of access points in a hexagonal cell model, each having a frequency channel or channel set.

In a conventional simple hexagonal cell model as shown in FIG. 7D herein, different carrier frequencies A, B, C are assigned to base stations located at the centers of hexagonal cell. In this frequency assignment scheme, cells using the same carrier frequency are separated by two other cells in between. For example cell A is separated from another cell A by intervening cells B and C. Similarly, cell B is separated from another B cell by intervening cells A and C operating at non-interfering different carrier frequencies.

In this embodiment, a network is initially configured in a location with more than one SAP 520. Each of the SAPs is configured to "sniff" or listen to the channels for other SAPs in a given area. This "sniffing" can be achieved by periodically tuning the receiver of the SAP to different channels. On listening for the other SAPs, the sniffing SAP registers amount of noise on the channels or frequency of transmission of the surrounding SAPs 520, and then selects a unique optimum frequency from the available set under the IEEE 802.11 standard, and FCC guidelines.

Figure 6:
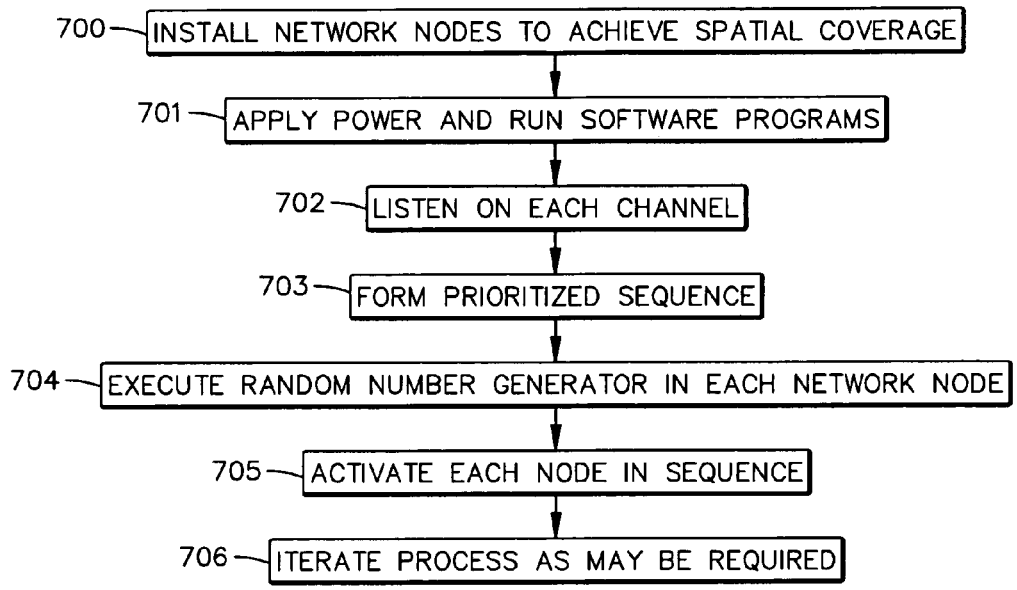
FIG. 6 is a flow chart describing the method according to the present invention.

In particular, the method according to the present invention is implemented by the following method operations, as set forth in the flow chart of FIG. 6.

First, one installs the set of access points over the region to achieve a desired spatial coverage for the wireless communication network (700).

Second, one simultaneously applies power to the set of access points to initiate an installation software program on each access point (701). The software program functions to enable each access point to listen on each frequency channel in each of the allowable frequency bands for a period of time T to determine the channels with the lowest average noise level (702), and then using such test and sample data, selecting a prioritized sequence of preferred frequency bands for operation (703). The software program in each access point then executes a random number generator. Each access point will then have be provided with a different number, which is used to specify which access point chooses first its preferred frequency band, i.e. the random number determines a prioritized sequence of access points in the set for activation (703).

In the first access point in the prioritized sequence of the set, the frequency band with the lowest noise level is selected, and the software program specifies operation in that frequency band for operation by the first access point, and activates such access point to operate in such band.

Then, in the second and subsequent access points in the prioritized sequence of N access points in the set, one listens on each frequency channel, and selects the frequency band with the lowest noise level, now considering the emitted signals from each previously activated access point. The software program identifies the frequency band among those available with the lowest average noise level, and activates each such access point in turn to operate its selected band (705). The process is iterated as is required with different groups of access points (706).

Since the selection of a frequency band for one SAP will change the "noise" level on that frequency band for other SAPs, the subsequent iterations exclude the already selected frequency band from the prioritized sequence in each other SAP. This may be done under control of a central network management unit, or simply by activating the SAP with the selected frequency band and letting the second and subsequent access points listen on the channels for all previously activated access points.

In a second embodiment of the present invention, the SAPs are installed and operational. The SAP software program periodically monitors the noise distribution over the allowable frequency bands from time to time during operation. For example, if during operation, the SAP has a large number of retries, the SAP follows the same process as discussed above, by initiating a "time-out" for operations in that unit and tuning the receiver to different channels or frequencies excluding the current channel or frequency of transmission. The goal of the sniffing is for the SAP 520 to see the current noise or interference level on each of the frequencies of the available frequency bands, and to select a different one if that selection will improve performance.

The second embodiment then provides a method of revising the frequency assignment for a set of stationary access points (SAP) for a local area network, each access point having associated with it a single fixed frequency band or hopping pattern selected from a number N prescribed frequency bands, more specifically defined by the following operations. First, in each access point, listen on each frequency channel in each of the frequency bands for a period of time T to determine the channels with the lowest average noise level, and selecting a preferred frequency band for operation in that SAP.

One then executes a random number generator in each installation software program in each SAP in the set of N access point to select a prioritized sequence of access points in the set to activate.

Then in the first access point in the prioritized sequence of the first set, select the frequency band with the lowest noise level, setting and specifying operation in that frequency band for operation by that access point, and activate such access point to operate in such band.

Finally, in the second and subsequent access points in the prioritized sequence of N access points in the first set, select the frequency band with the lowest noise level considering the emitted signals from each previously activated access point; specify operation in the frequency band with the lowest average noise level; and activate each such access point in turn.

In a third embodiment of the present invention, the SAPs are installed and operational. The SAP software program periodically monitors the noise distribution over the allowable frequency bands from time to time during operation. For example, if during operation, the SAP has a large number of retries, the SAP notifies a centralized network management unit or configuration controller which initiates a "time-out" for operations in that unit and a group of adjacent units. Then each timed out unit tunes the receiver to different channels or frequencies excluding the current channel or frequency of transmission of that unit. The goal of the sniffing is for each SAP 520 to see the current noise or interference level on each of the frequencies of the available frequency bands, and to select a different one if that selection will improve performance. A selection process similar to that in the first and second embodiments may be employed, but now under control of the management unit rather than utilizing a random selection process to prioritize the access points.

As discussed above, typically manufacturers hard code a frequency channel into a SAP. In initial layout of a network, SAPs are installed at locations to achieve a desired spatial coverage for a network. The SAP is loaded with software that soft codes an initial frequency into each SAP 520 in the ESS or network. The software is initiated by "power up" or simultaneously applying power to each SAP 520. In an implementation, the software includes a random number generator that generates an initial frequency for each SAP, helping prevent the SAPs 520 from choosing the same frequency during initialization. During operation, as provided in the present invention, the SAPs are "traffic adaptive," which allows an individual SAP to change or revise its channel of operation if it determines that there are other available channels which are not busy or have lower noise levels.

Each of the individual SAPs 520, although associated with different cells 525, can overlap in their range of coverage. To maintain optimal performance, interference from overlapping SAPs can be minimized by choosing different operating frequencies in directly adjacent SAPs through the use of the technique discussed above in the SAP, or through monitoring by the configuration controller 505 of its set of SAPs, 520, and reconfiguring each of the SAPs upon command of the controller.

The following table illustrates examples of the of frequencies and respective channel identifier that can be used in an embodiment of the present invention. The table represents only an example of the frequencies that can be used. In other implementations, other frequencies in the 802.11b standard can be used.

TABLE 1

| CHNL_ID | Frequency (MHz) |
| --- | --- |
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |

TABLE 1-continued

| CHNL_ID | Frequency (MHz) |
| --- | --- |
| 10 | 2457 |
| 11 | 2462 |
| 12 | 2467 |
| 13 | 2472 |
| 14 | 2484 |

FIG. 7A illustrates a first installation with a SAP 605 having a range or coverage 610 at a given power level. In a implementation, if no other SAPs are installed, and no channels are in use, the single SAP 605 sets frequency to 2412 MHz (channel 1).

FIG. 7B illustrates the SAP of FIG. 7A, with two additional SAPs 615, 625, each having a frequency range 620 and 630 respectively. SAP2 615 listens on the radio for other systems and finds that SAP1 605 on channel 1, and selects and sets its frequency to 2437 (channel 6). SAP3 625 listens on the radio receiver and finds SAP1 on channel 1 and SAP2 on channel 6, and sets its frequency to 2462 (channel 11).

FIG. 7C illustrates the SAPs of FIG. 7B, with an additional SAP 635 having a frequency range 640. SAP4 first listens to all channels and upon finding that all channels are being used, then checks each channel for signal quality. In this example, channel 11 or SAP3 has the strongest signal quality and SAP1 on channel 1 has the weakest signal on channel 3. Therefore SAP4 selects and sets its frequency to channel 3.

Referring to FIG. 7D a hexagonal cell model, in another situation having many SAP's, it may be that SAP4 finds that it has a large number of retries from another SAP or unknown RF device. SAP4 635 runs the clear channel-sniffing task, and selects a different channel until the number of retries goes down to an acceptable level. With a high number of retries, the SAP selects different channels until the retries go down. In this example, channel 3, the current channel, is eliminated and the channels set on SAP2, including channels on either side (5, 6, 7, 10 and 11). If none of the channels work, then it selects the weakest of SAP2 and SAP3. In the specific example of FIG. 7D, only 3 channels (A, B, C) are used.

Still another embodiment of the present invention is the implementation of a network node through the use of a user replaceable PC card or PCMCIA card. Such a card may be plugged into a laptop or portable computer, or even a desktop computer, to enable the computer to act as a network node or bridge between a wired network and a wireless local area network. More specifically, the laptop computer or desktop computer may be connected to a wired network such as the PSTN, or to a LAN through its Ethernet port. Installing the PC card unto the computer will provide the software and a radio transceiver to enable the computer to act as an access point for mobile terminals to wirelessly communicate with the computer, and thereby through the computer to the network.

Since such a desktop or laptop computer may be moved from location to location, and positioned or placed arbitrarily in an existing wireless network environment, it is important that at the initialization stage the PC card provide a program for the transceiver to determine which is the optimum frequency channel in which to operate which may vary from location to location. As in the previous embodiments, the installation of the PC card in the computer initiates a program to listen on the various available channels and to prioritize each of the channels in terms of the noise and characteristics as measured over a period of time. Assuming there is only one card and one computer, the computer program will then execute a program to prioritize the frequency channels in order of acceptability in terms of noise characteristics and elect to operate on the most optimum channel. As in the other embodiments noted above, the PC card software also includes a test mode that will cause the unit to suspend operations and test all channels to see whether the current channel on which operations are taking place is the most optimum channel for use. Such periodic test operations may take place at various time intervals or may be in response to an excessive number of retries due to heavy traffic or load conditions on the channel.

The embodiment more generally provides a software method for extending the functionality of a computer connected to a wired communications network to implement a wireless local area network, in which one installs a wireless LAN transceiver module in a computer; and loads software into the computer from the module to provide an interface between the wired communications network and the radio transceiver in the module.

A set of menu controls may be present on a display of the computer to enable the user to define feature and service options for the wireless network such as channel selection and network configuration. The software then configures the wireless LAN module transceiver to process packets to and from the wireless network in accordance with the criteria specified by the user.

Although the above described embodiment envisions the desktop or laptop computer connected to a wired communications network, it is also envisioned that the desktop or laptop computer may connect to other types of computer networks through wireless transceivers or modems for wide area networks, satellite networks, cordless telephone networks, paging networks, and the like. The PC card provides connectivity from a wired network to the wireless local area network, i.e. acts as a bridge between one type of network and a wireless local area network. Even if the desktop or laptop computer is not connected to a second network, the installation of the PC card will still enable the desktop or laptop computer to act as a repeater, or centralized relay or transfer point, to allow mobile units to communicate with each other through the relay or transfer point. Such an application is important in certain types of wireless local area networks which do not envision peer to peer communications, but which are designed to operate through access points. Because of the mobility of a laptop computer or other mobile computer in which the PC card incorporating the software according to the present invention is implemented, and the variable nature of the ambient environment with respect to frequency channel noise, the ability for the transceiver to change frequencies adaptively is a critical aspect of point of utility of the present invention.

Various aspects of the techniques and apparatus may be implemented in digital circuitry, or in computer hardware, firmware, software, or in combinations of them. Apparatus of the invention may be implemented in a computer products tangibly embodied in a machine-readable storage device for execution by a programmable processor. The foregoing techniques may be performed, for example, by a programmable processor executing a program of instructions to perform functions of the invention by operating on input data and generating output. The methods may advantageously be implemented in one or more computer programs that are executable on a programmable system including at least one programmable processor coupled to receive data and instructions from, and to transmit data and instructions to, a data storage system, at least one in/out device, and at least one output device. Each computer program may be implemented in a high-level procedural or object-oriented programming language, or in assembly or machine language if desired; and in any case, the language may be compiled or interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application-specific integrated circuits (ASICS).

A number of embodiments of the invention have been described. Nevertheless, it will be understood that various modifications may be made without departing from the spirit and scope of the invention. Accordingly, other embodiments are within the scope of the following claims.

What is claimed is:

1. A method using software on a computer readable medium for selecting a frequency channel for use by a network unit among a group of network units in a wireless local area network, comprising:
   detecting in each network unit the noise level on each of a plurality of available channels from surrounding stationary network nodes;
   prioritizing the selection of a channel from the available channels based upon the noise characteristics in each of the available channels measured over a period of time; executing an algorithm in each network unit to determine the sequence of activation of each network unit in the group of network units to select from the prioritized channels; and activating each network unit in turn to select a channel and to subsequently operate such network unit on such selected channel.

2. The method of claim 1 wherein the set of available channels are non-overlapping channels in a spread spectrum system.

3. The method of claim 1 wherein the group of network units consists of three adjacent units in a hexagonal cell model.

4. The method of claim 3 further comprising repeating the detection of signals from surrounding nodes using a different group of network units.

5. The method of claim 1 further comprising excluding an available frequency channel during subsequent selections once if the available frequency has been selected by a network unit.

6. The method of claim 1 further comprising using power up to initiate the frequency channel selection process.

7. The method of claim 1 wherein the algorithm includes utilizing a random number generator to initially assign priorities each network unit.

8. The method of claim 1 wherein each network unit is a stationary base station.

9. The method of claim 1 wherein the wireless local area network is a IEEE 802.11b network.

10. The method of claim 1 further comprising periodically sampling the retry rate of a network unit and executing a channel re-allocation algorithm if the retry rate exceeds a threshold.

11. The method of claim 10 further comprising utilizing a configuration controller to suspend operations of a group of network units while a re-allocation algorithm is executed.

12. The method of claim 11 wherein said suspended network units are those units directly adjacent to the network unit initiating the re-allocation algorithm.

13. A method of initializing a set of stationary access points for a wireless local area network, the access points being connected to a wired communications network, wherein the access points include transceivers for communicating with mobile units within a predetermined operational range therefrom and are spatially distributed over a region in which the operational range of at least some of the access points overlap, each access point having associated with it a single fixed frequency band selected from a number N of non-overlapping prescribed frequency bands, comprising the steps of:

installing the set of access points over the region to achieve a desired spatial coverage for the wireless communication network; simultaneously applying power to said set of access points to initiate an installation software program on each access point;

in each access point, listening on each frequency channel in each of the frequency bands for a period of time T to determine the channels with the lowest average noise level, and selecting a preferred frequency band for operation;

executing a random number generator in each installation software program in each set of N access point to select a prioritized sequence of access points in the set to activate;

in the first access point in the prioritized sequence of the first set, selecting the frequency band with the lowest noise level, setting and specifying operation in said frequency band for operation by said access point, and activating such access point to operate in such band; and in the second and subsequent access points in the prioritized sequence of N access points in the first set, selecting the frequency band with the lowest noise level considering the emitted signals from each previously activated access point, and specifying operation in the frequency band with the lowest average noise level, and activating each such access point in turn to operate in each respective selected band.

14. A method of revising the frequency assignment for a set of stationary access points for a local area network, wherein the access points include transceivers for communicating with mobile units within a predetermined operational range therefrom and the access points are distributed over a region in which the operational range of at least some of the access points overlap, each access point having associated with it a single fixed frequency band or hopping pattern selected from a number N prescribed frequency bands, comprising the steps of:

in each access point, listening on each frequency channel in each of the frequency bands for a period of time T to determine the channels with the lowest average noise level, and selecting a preferred frequency band for operation;

executing a random number generator in each installation software program in each set of N access point to select a prioritized sequence of access points in the set to activate;

in the first access point in the prioritized sequence of the first set, selecting the frequency band with the lowest noise level, setting and specifying operation in said frequency band for operation by said access point, and activating such access point to operate in such band; and in the second and subsequent access points in the prioritized sequence of N access points in the first set, selecting the frequency band with the lowest noise level considering the emitted signals from each previously activated access point, and specifying operation in the frequency band with the lowest average noise level, and activating each such access point in turn to operate in each respective selected band.

15. A computer-readable storage medium containing a set of computer-executable instructions for selecting a frequency channel for use by a network unit among a group of network units in a wireless local area network, the instructions comprising:

detecting in each network unit the noise level on each of a plurality of available channels from surrounding stationary network nodes;

prioritizing the selection of a channel from the available channels based upon the noise characteristics in each of the available channels measured over a period of time; executing an algorithm in each network unit to determine the sequence of activation of each network unit in the group of network units to select from the prioritized channels; and activating each network unit in turn to select a channel and to subsequently operate such network unit on such selected channel.

16. The computer readable medium of claim 15 wherein the set of available channels are non-overlapping channels in a spread spectrum system.

17. The computer readable medium of claim 15 wherein the group of network units consists of three adjacent units in a hexagonal cell model.

18. The computer readable medium of claim 17 the instructions further comprising repeating the detection of signals from surrounding nodes using a different group of network units.

19. The computer readable medium of claim 15 the instruction further comprising excluding an available frequency channel during subsequent selections once if the available frequency has been selected by a network unit.

20. The computer readable medium of claim 15 the instructions further comprising using power up to initiate the frequency channel selection process.

21. The computer readable medium of claim 15 wherein the algorithm includes utilizing a random number generator to initially assign priorities each network unit.

22. The computer readable medium of claim 15 wherein each network unit is a stationary base station.

23. The computer readable medium of claim 15 wherein the wireless local area network is a IEEE 802.11b network.

24. The computer readable medium of claim 15 the instructions further comprising periodically sampling the retry rate of a network unit and executing a channel re-allocation algorithm if the retry rate exceeds a threshold.

25. The computer readable medium of claim 24 the instructions further comprising utilizing a configuration controller to suspend operations of a group of network units while a re-allocation algorithm is executed.

26. The computer readable medium of claim 25 wherein said suspended network units are those units directly adjacent to the network unit initiating the re-allocation algorithm.

27. A computer-readable storage medium containing a set of computer-executable instructions for initializing a set of stationary access points for a wireless local area network, the access points being connected to a wired communications network, wherein the access points include transceivers for communicating with mobile units within a predetermined operational range therefrom and are spatially distributed over a region in which the operational range of at least some of the access points overlap, each access point having associated with it a single fixed frequency band selected from a number N of non-overlapping prescribed frequency bands, the instructions comprising:

installing the set of access points over the region to achieve a desired spatial coverage for the wireless communication network;

simultaneously applying power to said set of access points to initiate an installation software program on each access point;

in each access point, listening on each frequency channel in each of the frequency bands for a period of time T to determine the channels with the lowest average noise level, and selecting a preferred frequency band for operation;

executing a random number generator in each installation software program in each set of N access point to select a prioritized sequence of access points in the set to activate;

in the first access point in the prioritized sequence of the first set, selecting the frequency band with the lowest noise level, setting and specifying operation in said frequency band for operation by said access point, and activating such access point to operate in such band; and in the second and subsequent access points in the prioritized sequence of N access points in the first set, selecting the frequency band with the lowest noise level considering the emitted signals from each previously activated access point, and specifying operation in the frequency band with the lowest average noise level, and activating each such access point in turn to operate in each respective selected band.

28. A computer-readable storage medium containing a set of computer-executable instructions for revising the frequency assignment for a set of stationary access points for a local area network, wherein the access points include transceivers for communicating with mobile units within a predetermined operational range therefrom and the access points are distributed over a region in which the operational range of at least some of the access points overlap, each access point having associated with it a single fixed frequency band or hopping pattern selected from a number N prescribed frequency bands, the instructions comprising:

in each access point, listening on each frequency channel in each of the frequency bands for a period of time T to determine the channels with the lowest average noise level, and selecting a preferred frequency band for operation;

executing a random number generator in each installation software program in each set of N access point to select a prioritized sequence of access points in the set to activate;

in the first access point in the prioritized sequence of the first set, selecting the frequency band with the lowest noise level, setting and specifying operation in said frequency band for operation by said access point, and activating such access point to operate in such band; and in the second and subsequent access points in the prioritized sequence of N access points in the first set, selecting the frequency band with the lowest noise level considering the emitted signals from each previously activated access point, and specifying operation in the frequency band with the lowest average noise level, and activating each such access point in turn to operate in each respective selected band.

\* \* \* \* \*